United States Patent
Cho

(10) Patent No.: US 9,851,430 B2
(45) Date of Patent: Dec. 26, 2017

(54) POSITIONING METHOD AND APPARATUS USING WIRELESS SIGNAL

(71) Applicant: Electronics and Telecommunications Research Institute, Daejeon (KR)

(72) Inventor: Jai Hyung Cho, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 305 days.

(21) Appl. No.: 14/726,834

(22) Filed: Jun. 1, 2015

(65) Prior Publication Data
US 2016/0011297 A1 Jan. 14, 2016

(30) Foreign Application Priority Data
Jul. 11, 2014 (KR) .......................... 10-2014-0087636

(51) Int. Cl.
*G01S 5/06* (2006.01)
*G01S 3/02* (2006.01)

(52) U.S. Cl.
CPC ...................... *G01S 5/06* (2013.01)

(58) Field of Classification Search
CPC .................................. G01S 1/30; G01S 1/304
USPC ..... 342/394, 442, 457, 458, 464; 455/456.5, 455/457
See application file for complete search history.

(56) References Cited

U.S. PATENT DOCUMENTS

| | | | | |
|---|---|---|---|---|
| 5,592,180 A | * | 1/1997 | Yokev | G01S 1/026 342/446 |
| 6,640,107 B1 | | 10/2003 | Kuwahara et al. | |
| 7,853,252 B1 | | 12/2010 | Longginou et al. | |
| 8,026,850 B2 | | 9/2011 | Seong et al. | |
| 2001/0034223 A1 | * | 10/2001 | Rieser | G01S 5/02 455/404.2 |
| 2011/0021209 A1 | | 1/2011 | Longginou et al. | |
| 2011/0074635 A1 | | 3/2011 | Yeo et al. | |

FOREIGN PATENT DOCUMENTS

| | | |
|---|---|---|
| JP | 2002135833 A | 5/2002 |
| KR | 1019957004698 A | 11/1995 |
| KR | 1019990084230 A | 12/1999 |
| KR | 1020000001518 A | 1/2000 |
| KR | 1020030083225 A | 10/2003 |
| KR | 1020110009551 A | 1/2011 |

OTHER PUBLICATIONS

K. M. Yeo, et al., "Location Based Service Technologies and Standards", Electronics and Telecommunications Trends, Dec. 2010, vol. 25, No. 6.

* cited by examiner

*Primary Examiner* — Dao Phan
(74) *Attorney, Agent, or Firm* — William Park & Associates Ltd.

(57) ABSTRACT

A terminal that receives carrier signals with start point information indicated thereon from three or more base stations (BSs) including a serving BS, calculates a difference in phase angles between carrier signals of two BSs while changing the two BSs by using the start point information of the carrier signals of the two BSs among the three or more BSs, and calculates coordinates of the terminal by using the calculated differences in distance of arrival is provided.

20 Claims, 10 Drawing Sheets

POSITIONING METHOD AND APPARATUS USING WIRELESS SIGNAL

CROSS-REFERENCE TO RELATED APPLICATION

This application claims priority to and the benefit of Korean Patent Application No. 10-2014-0087636 filed in the Korean Intellectual Property Office on Jul. 11, 2014, the entire contents of which are incorporated herein by reference.

BACKGROUND OF THE INVENTION (a) Field of the Invention

The present invention relates to a positioning method and apparatus using a wireless signal, and more particularly, to a positioning method and apparatus used to calculate a location of a terminal by measuring phase differences between wireless signals having periods received from three or more base stations adjacent to a terminal.

(b) Description of the Related Art

In general, methods for enhancing precision of satellite navigation technologies such as the global positioning system (GPS) and the like include differential GPS, a positioning method using a GPS carrier phase, and the like.

The D-GPS, a method of correcting a GPS signal error generated due to diffraction of the atmosphere, an abnormality of a satellite orbit, and the like, is known to improve an error level by up to a 1-meter level in good conditions. However, in an environment in which line-of-sight (LOS) with respect to a satellite is not guaranteed, such as a downtown area, an indoor area, or a mountainous area, an error range increases due to an effect such as delay spread due to multiple paths.

A GPS broadcast wave phase scheme (or RealTime Kinematics (RTK) method), which calculates the number of wavelengths of a satellite carrier signal ranging from 1.5 GHz to 2 GHz and a phase difference, significantly improves positioning precision to a centimeter level. In a GPS carrier phase method, it is important to accurately synchronize a start point at which a positioning terminal and a reference station starts to count wavelengths of simultaneously received satellite carriers, and here, if the positioning terminal moves at a fast speed or if a satellite signal is temporarily blocked by a nearby obstacle or interfered with by slight noise, a phase slip phenomenon in which the number of wavelengths counted by the positioning terminal is different from that of the reference station occurs, causing a positioning error. In this case, the positioning terminal should again start a phase tracking synchronization process with respect to the reference station from scratch.

Meanwhile, in a method of performing positioning using a ground mobile communication base station signal, without relying on the GPS, position coordinates of a positioning terminal are calculated using a cell ID or using a time difference of arrival of signals between a base station and the positioning terminal, and as such, a technique such as observed time difference of arrival (OTDOA) or the like has been known. However, with the positioning methods based on a ground mobile communication base station signal, time synchronization precision between base stations is inferior to that of GPS satellites supporting precise time synchronization by an atomic clock, or the like, and a positioning error of a few meters to tens of meters or greater occurs due to limitations in a bandwidth, a sampling time interval, and the like, of a general broadband mobile communication wireless system.

In order to reduce the error limitations of the ground mobile communication base station-based positioning methods, a positioning method based on a phase measurement of a reception signal in a wireless communication network has been proposed. In this method, a positioning terminal calculates phase rotation values of time-synchronized OFDM preamble signals from three or more adjacent base stations, and obtains absolute coordinate values thereof by using differences in the phase rotation values of the three or more base stations and differences in distances converted therefrom.

In the positioning method based on phase measurement of a reception signal, since continuous rotation values of a signal phase are used, a time error due to discretized sampling is reduced and more precise time resolving power (or resolution) can be obtained. However, the positioning method fails to improve precision beyond a theoretical sampling time interval limitation, i.e., a bandwidth limitation, and does not provide a method for reducing an error occurring when base stations are not synchronized in time.

In general, mobile communication base station systems perform time synchronization based on GPS satellite signals, and in this case, a synchronization error of nanoseconds (ns) or greater may occur on the ground. A resultant positioning error may be a few meters or greater.

Also, in the foregoing positioning methods based on satellite and ground base station signals, when positioning is performed in a downtown area or a mountainous area, a signal is subjected to reflection and diffraction with a nearby building or obstacle and reach through various paths. In this case, when a position is calculated on the basis of the reflected or diffracted signal, the calculated position may be different from an actual position, and the resultant positioning error may range from a few meters to tens of meters. Thus, the related art positioning methods based on satellites and base stations generally have a severe positioning error in a downtown area or in a mountainous area or cannot be used in an indoor area.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a positioning method and apparatus having advantages of calculating a location of a terminal by measuring phase differences between wireless signals having periods received from three or more base stations adjacent to a terminal.

An exemplary embodiment of the present invention provides a positioning method of a terminal using a wireless signal. The positioning method may include: receiving carrier signals with start point information indicated thereon from three or more base stations (BSs) including a serving BS; calculating a difference in phase angles between carrier signals of two BSs, while changing the two BSs, by using the start point information of the carrier signals of the two BSs among the three or more BSs; calculating differences in distances of arrival from the corresponding two BSs to the terminal by using the calculated differences in phase angles;

and calculating coordinates of the terminal by using the calculated differences in distances of arrival.

At least one among a phase, an amplitude, and a frequency of the carrier signal may be changed on the basis of the start point period, and the calculating may include detecting the point at which at least one among the phase, the amplitude, and the frequency is changed, as a start point of the carrier signals.

The receiving may include: calculating a propagation incident angle range of each of the nearby BSs on the basis of the coordinates of the terminal and coordinates of the nearby BSs; and filtering only a carrier signal received within the propagation incident angle ranges of each of the BSs.

The calculating may include: generating diffraction paths from BSs, among the nearby BSs, to the terminal by using 3D map information; calculating differences in lengths between the diffraction paths from two BSs to the terminal, while changing the two BSs, among the nearby BSs; calculating an error between the difference in lengths between the diffraction paths calculated with respect to the same BS subject and a difference in distances of arrival; and calculating coordinates of the terminal by using the error value.

The generating of diffraction paths may include: generating a linear vector connecting the coordinates of the terminal and coordinates of any one BS; generating an edge vector forming a plane from plane information of a building adjacent to the terminal, while intersecting the linear vector, by using the 3D map information; calculating an orthogonal projection point to which the linear vector between the terminal and any one BS is projected on the edge vector; and linking the calculated orthogonal projection point, the any one BS, and the terminal to generate a diffraction path from the any one BS to the terminal.

The calculating of coordinates of the terminal may include calculating the coordinates of the terminal at which the error value is minimized.

The calculating of a difference in distances of arrival may include: receiving an offset value with respect to a difference in phase angles between the serving BS and a neighbor BS of the serving BS, calculated by the serving BS, from the serving BS; and compensating for the difference in phase angles between the carrier signals of the two BSs by using the received offset value.

The receiving of the offset value may include: receiving, by the serving BS, the carrier signal from the neighbor BS; calculating, by the serving BS, a phase angle of the carrier signal with respect to a start point of the carrier signal of the neighbor BS; calculating, by the serving BS, an offset value with respect to a difference in phases between a phase angle calculated with respect to the start point of the carrier signal transmitted by the serving BS and a phase angle calculated with respect to the start point of the carrier signal of the neighbor BS; and transmitting, by the serving BS, the offset value.

The receiving may include transmitting, by the three or more BSs, carrier signals with frequencies of different bands.

The receiving may include transmitting, by the three or more BSs, carrier signals at mutually different times.

Another exemplary embodiment of the present invention provides a positioning apparatus of a terminal using a wireless signal. The positioning apparatus may include a reception unit, a phase tracking unit, a plurality of phase clock units, and a control unit. The reception unit may receive carrier signals with start point information indicated thereon from three or more nearby base stations (BSs) including a serving BS. The phase tracking unit may detect a start point and a start point period of each of the carrier signals of the BSs. The plurality of phase clock units may calculate a phase angle of each of the carrier signals of the BSs with respect to a start point of each of the carrier signals of the BSs. The control unit may calculate a difference in phase angles between carrier signals of two BSs, among the nearby BSs, while changing the two BSs, calculate a difference in distances of arrival from the corresponding two BS to the terminal by using the calculated differences in phase angles, and calculate coordinates of the terminal by using the calculated differences in distances of arrival.

The control unit may generate diffraction paths from the BSs to the terminal by using the calculated coordinates of the terminal and 3D map information, and correct the coordinates of the terminal by using the diffraction paths from the BSs to the terminal.

The control unit may calculate differences in lengths between the diffraction paths from two BSs to the terminal, while changing the two BSs, calculate an error between the difference in lengths between the diffraction paths calculated with respect to the same BS subject and a difference in distances of arrival, and correct coordinates of the terminal by using the error value.

The control unit may generate a linear vector connecting the coordinates of the terminal and coordinates of any one BS, generate an edge vector forming a plane from plane information of a building adjacent to the terminal while intersecting the linear vector by using the 3D map information, calculate an orthogonal projection point to which the linear vector between the terminal and any one BS is projected on the edge vector, and link the calculated orthogonal projection point, the any one BS, and the terminal to generate a diffraction path from the any one BS to the terminal.

The control unit may control the reception unit to filter only a carrier signal received within a propagation incident angle range of the directions of the nearby BSs.

The control unit may calculate a propagation incident angle range of each BS on the basis of the coordinates of the terminal and the coordinates of the nearby BSs received from the serving BS.

At least one among a phase, an amplitude, and a frequency of the carrier signal may be changed on the basis of the start point period, and the phase tracking unit may detect the point at which at least one among the phase, the amplitude, and the frequency is changed, as a start point of the carrier signals.

Each of the plurality of phase clock units may synchronize a phase clock with respect to the carrier signal of the corresponding BS to a wavelength of the corresponding carrier signal, and when a start point of the carrier signal of the corresponding BS is detected, each of the plurality of phase clock units may reset a phase clock with respect to the carrier signal of the corresponding BS.

The reception unit may receive at least one offset value with respect to a difference in phase angles between the serving BS and a neighbor BS of the serving BS, calculated by the serving BS, through the serving BS, and the control unit may compensate for each difference in phase angles between the carrier signals by using the at least one offset value.

When the interval of the start point period is converted into a distance, the distance may be longer than a maximum distance between two BSs.

DETAILED DESCRIPTION OF THE EMBODIMENTS

Figure 1:
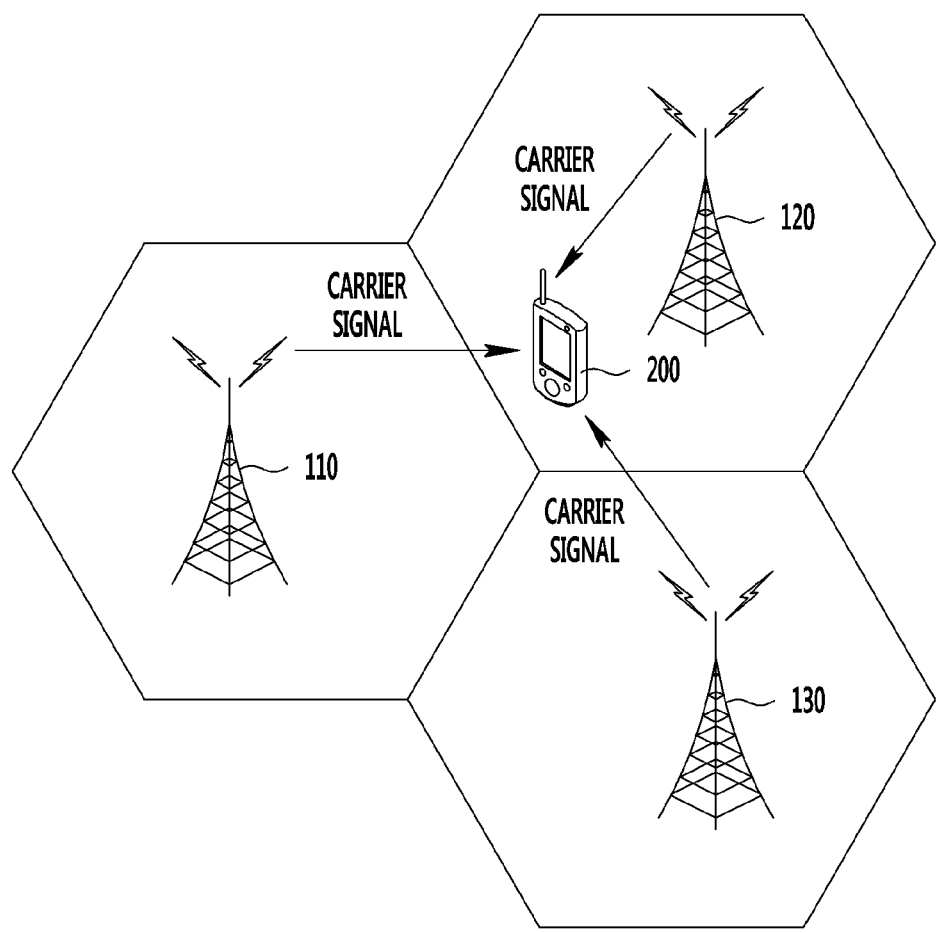
FIG. 1 is a view illustrating an example of a wireless communication system to which the present invention is applied.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, a terminal may refer to user equipment (UE), a mobile terminal (MT), a mobile station (MS), an advanced mobile station (AMS), a high reliability mobile station (HR-MS), a subscriber station (SS), a portable subscriber station (PSS), an access terminal (AT), or the like, and may include the entirety or a portion of functions of the UE, MT, MS, AMS, HR-MS, SS, PSS, AT, or the like.

Also, a base station (BS) may refer to a node B, an evolved node B (eNB), an advanced base station (ABS), a high reliability base station (HR-BS), an access point (AP), a radio access station (RAS), a base transceiver station (BTS), or the like, and may include the entirety or a portion of functions of the node B, eNB, BS, ABS, HR-BS, AP, RAS, BTS, or the like.

Throughout the specification and claims, unless explicitly described to the contrary, the word "comprise" and variations such as "comprises" or "comprising" will be understood to imply the inclusion of stated elements but not the exclusion of any other elements.

Hereinafter, a positioning method and apparatus using a wireless signal according to an exemplary embodiment of the present invention will be described in detail with reference to the accompanying drawings.

FIG. 1 is a view illustrating an example of a wireless communication system to which the present invention is applied.

Referring to FIG. 1, a wireless communication system includes a plurality of base stations (BSs) 110, 120, and 130, and a terminal 200.

The BSs 110, 120, and 130 may provide a communication service to the terminal 200 present in a particular geographical area called a cell, and may be installed and operated in various forms such as a macrocell, a picocell, a microcell, and the like, according to an installation purpose and a size of cell coverage.

The terminal 200 is a terminating point of a wireless channel, which is connected to a single BS and provided with a communication service.

The BSs 110, 120, and 130 transmit a carrier signal having a period, for the purpose of positioning the terminal 200. The carrier signal may be a single carrier signal or a plurality of carrier signals.

The BSs 110, 120, and 130 may use carrier frequencies of different bands to avoid interference, or in case of using the same carrier frequency, transmission timing is divided in a time division manner among the BSs according to previously agreed rules to transmit carrier signals, thereby avoiding mutual interference.

The BSs 110, 120, and 130 may explicitly or indirectly indicate a start point on a carrier signal and transmit the same, such that a neighbor BS or the terminal 200 can easily find the start point from which the number of wavelengths of the carrier signal is counted.

The BSs 110, 120, and 130 may receive carrier signals transmitted by neighbor BSs. Each of the BSs 110, 120, and 130 detects start points of carrier signals from neighbor BSs, and calculates an error, i.e., an offset value, with respect to a phase difference between phase angles of carrier signals from neighbor BSs measured with reference to the start points of the carrier signals from the neighbor BSs and phase angles of carrier signals measured with reference to start points of carrier signals transmitted by the BSs 110, 120, and 130.

The BSs 110, 120, and 130 broadcast the calculated offset value to the terminal 200 within a cell radius served by the BSs 110, 120, and 130.

The terminal 200 receives carrier signals from the nearby BSs 110, 120, and 130. Also, the terminal 200 receives coordinate information of the nearby BSs and an offset value calculated by the serving BS 120 from the serving BS 120.

The terminal 200 tracks a phase and a start point period of each of carrier signals received from the BSs to count the number of wavelengths of each of the carrier signals of the BSs, and calculates a difference in phase angles between the carrier signals of two BSs. The terminal 200 compensates for the difference in phase angles between carrier signals of two BSs, calculated by the terminal 200 itself, by using the offset value received from the serving BS.

The terminal 200 calculates a difference in distances of arrival from the two corresponding BSs to the terminal 200 by using the difference in phase angles between the carrier signals, which has been compensated with the offset value.

In this manner, the difference in distances of arrival can be calculated from the carrier signals of the two different BSs, and approximate coordinates of the terminal 200 may be calculated using the calculated difference in distances of arrival.

In order to reduce an error due to multiple paths of propagation, the terminal 200 may use three-dimensional (3D) geographical information. That is, the terminal 200 may recognize a shape and a position of an obstacle placed in a linear distance between the terminal 200 and the BSs 110, 120, and 130, and calculate accurate distances of arrival between the terminal 200 and the BSs 110, 120, and 130 in consideration of diffraction paths of propagation, thus enhancing accuracy of positioning.

Figure 2:
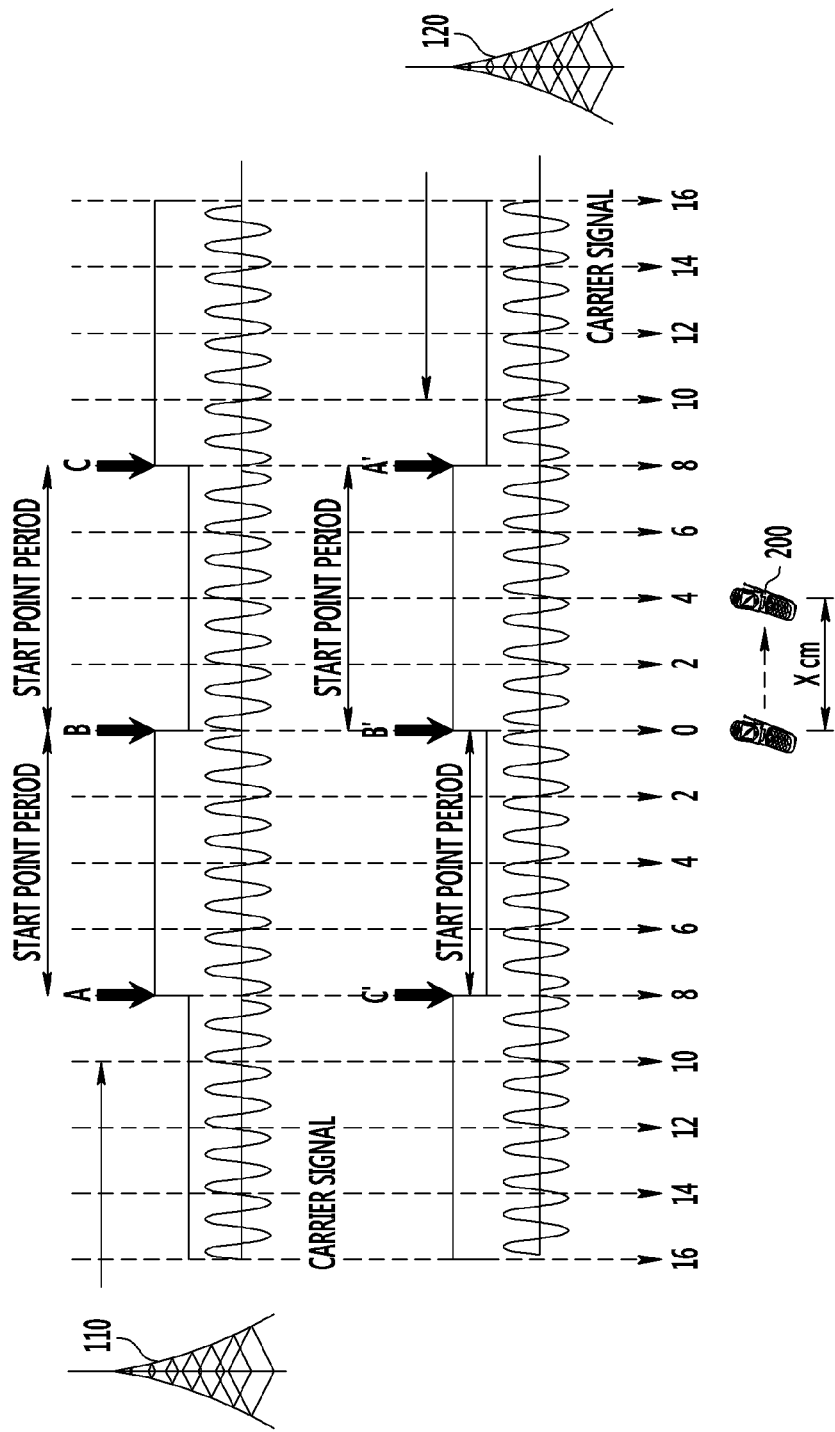
FIG. 2 is a view illustrating an example of indicating start points in a carrier signal according to an exemplary embodiment of the present invention.

FIG. 2 is a view illustrating an example of indicating start points in a carrier signal according to an exemplary embodiment of the present invention.

Referring to FIG. 2, the BS 110 transmits a carrier signal having n number of wavelengths, and thereafter, the BS 110 inverts a phase of the carrier signal by 180 degrees to transmit the phase-inverted carrier signal having n number of wavelengths.

Then, points at which the phase of the carrier signal is inverted are start points A, B, and C of the carrier signal.

In this manner, by inverting the phase of the carrier signal according to the start point period, the start points A, B, and C of the carrier signal may be indicated.

The BS 120 also transmits a carrier signal having n number of wavelengths, and thereafter, the BS 120 inverts the phase of the carrier signal by 180 degrees and transmits the phase-inverted carrier signal having n number of wavelengths, thus indicating start points A', B', and C' in the carrier signal.

In this manner, the terminal 200, which receives the carrier signal including the start point information, may detect the phase inverted points of the repeatedly transmitted carrier signal as start points, even in a shadow area in which signal strength is weak or in an environment with severe noise, and count the number of wavelengths of the carrier signal from each of the start points of the carrier signal to measure a phase angle.

In addition to the method, various other methods such as a method of using amplitude modulation of the carrier signal, a method of using frequency modulation of the carrier signal, a method of using a phase difference between a plurality of carrier signals having different frequencies, as an indirect start point indicator, and the like, may also be used as a method of indicating start point information on the carrier signal.

The intervals between the start points A, B, and C of the carrier signal may be longer than a maximum distance between two neighbor BSs 110 and 120 when the intervals are converted into distances. For example, when it is assumed that the BS 110 transmits the start point (A, B, C) information by using a carrier signal having n number wavelengths in which the length of one wavelength is p, a distance between certain two start points is pxn, and the length (=pxn) is longer than the maximum distance between the two neighbor BSs 110 and 120.

Figure 3:
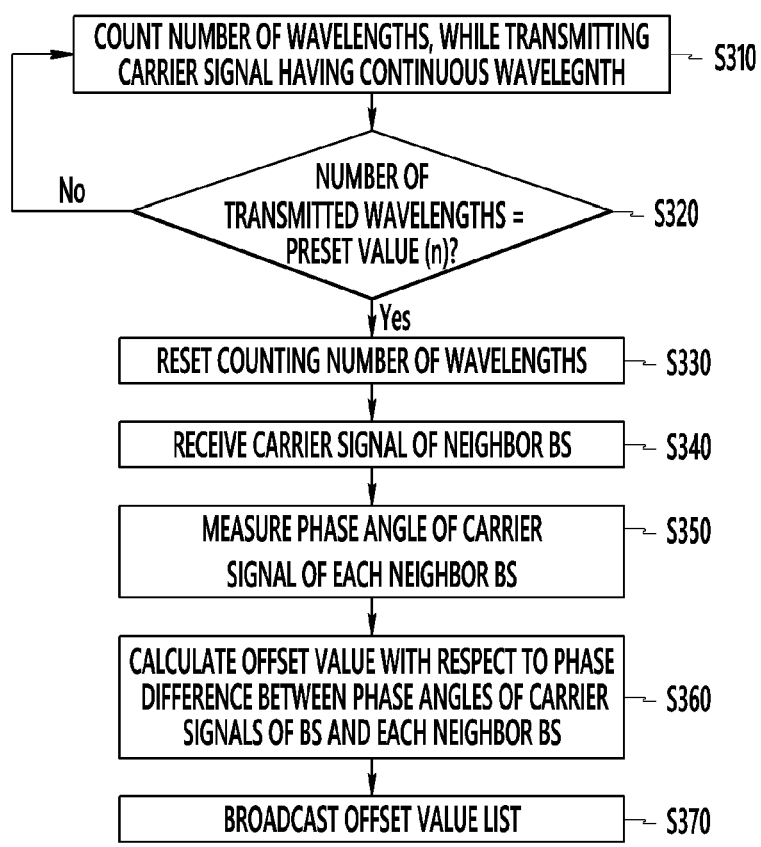
FIG. 3 is a flowchart illustrating a method for calculating an offset value in a base station according to an exemplary embodiment of the present invention.

FIG. 3 is a flowchart illustrating a method for calculating an offset value in a base station according to an exemplary embodiment of the present invention. In FIG. 3, for the purposes of description, the method of calculating an offset value by the BS 110 will be described, and the other BSs 120 and 130 may also calculate an offset value in the same manner.

Referring to FIG. 3, the BS periodically counts the number of wavelengths, while transmitting a carrier signal having continuous wavelengths using the method illustrated in FIG. 2 (S310).

When the number of wavelengths of the transmitted carrier signal corresponds to the preset value (n) (S320), the BS 110 initializes a wavelength number counter (S330).

The BS 110 repeats the steps S310, S320, and S330 by inverting the phase of the carrier signal by 180 degrees and continuously transmitting the wavelengths.

In this manner, the BS 110 transmits the carrier signal.

The BS 110 receives carrier signals transmitted from the neighbor BSs (e.g., 120 and 130) (S340).

The BS 110 tracks phases and start points of the carrier signals received from the neighbor BSs 120 and 130.

When start points of the carrier signals from the BSs 120 and 130 are detected, the BS 110 counts the number of wavelengths of the corresponding carrier signals with respect to the start points of the carrier signals of the neighbor BSs 120 and 130 to measure phase angles (S350).

Thereafter, the BS 110 calculates offset values with respect to a relative phase difference between a phase angle measured from a start point of the carrier signal transmitted by the BS 110 and the phase angles measured from the start points of the carrier signals of the neighbor BSs 120 and 130 (S360), and stores the calculated offset values in an internal memory.

In this manner, the BS 110 calculates the offset values with respect to all the neighbor BSs and stores the calculated offset values in the internal memory.

For example, when it is assumed that a BS A receives a carrier signal from a BS B and calculates an offset value, the offset value may be calculated as expressed by Equation 1 below.

$$O_B = ((\phi_A - \phi_B - 2\pi d/\lambda) + 2\pi n) \mod 2\pi n \quad \text{(Equation 1)}$$

In Equation 1, $(\phi_A - \phi_B)$ is a phase difference between a phase angle measured from a start point of the carrier signal transmitted from the BS A and a phase angle measured from a start point of the carrier signal received from the BS B. "d" denotes a distance between the BS A and the BS B, and $\lambda$ denotes a length of a wavelength of a carrier signal. $2\pi n$ denotes a start point period, that is, n number of wavelength intervals, and mod denotes a modulo operation.

Similarly, when it is assumed that the BS B receives a carrier signal from the BS A and calculates an offset value, the offset value may be calculated as expressed by Equation 2 below.

$$O_A = ((\phi_B - \phi_A - 2\pi d/\lambda) + 2\pi n) \mod 2\pi n \quad \text{(Equation 2)}$$

The BS 110 broadcasts an offset value list stored in the internal memory to the terminal 200 within a cell radius (S370). The BS 110 may broadcast coordinate information thereof and coordinate information of a neighbor BS, together with the offset value list, to the terminal 200 within the cell radius. The offset value list may be periodically broadcasted.

Then, the terminal 200 may receive the offset value list from the serving BS (e.g., 120).

Figure 4:
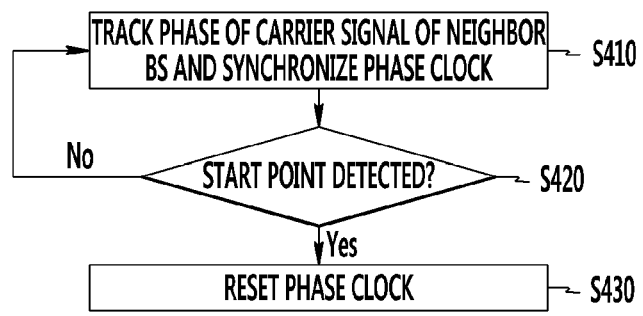
FIG. 4 is a flowchart illustrating a method for synchronizing a phase clock of a carrier signal received by a base station according to an exemplary embodiment of the present invention.

FIG. 4 is a flowchart illustrating a method for synchronizing a phase clock of a carrier signal received by a base station according to an exemplary embodiment of the present invention.

Referring to FIG. 4, the BS 110 receives carrier signals periodically transmitted from the neighbor BSs 120 and 130.

The BS 110, while tracking phases of the received carrier signals of the neighbor BSs 120 and 130, synchronizes the phase clocks of the corresponding carrier signals to wavelengths of the corresponding carrier signals (S410).

When the BS 110 detects start points of the carrier signals (S420), the BS 110 initializes the phase clocks again (S430).

Accordingly, the BS 110 can accurately calculate offset values measured from start points of the carrier signals of the neighbor BSs 120 and 130.

Figure 5:
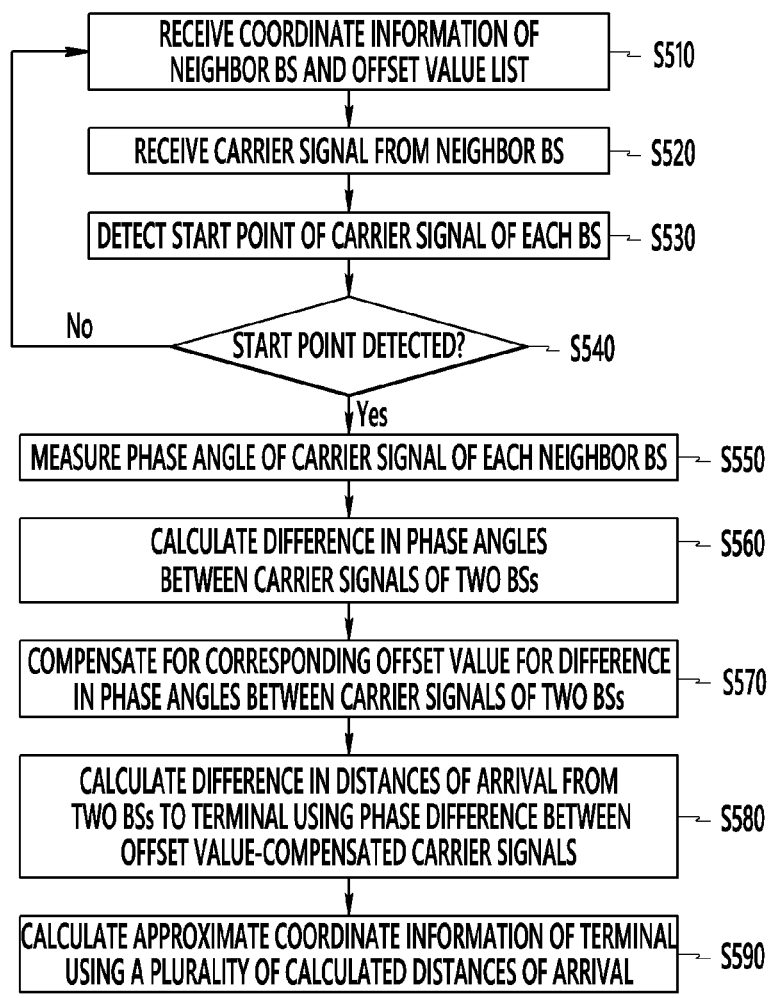
FIGS. 5 through 7 are flowcharts illustrating a method for calculating a location of a terminal according to first to third exemplary embodiments of the present invention.

FIG. 5 is a flowchart illustrating a method for calculating a location of a terminal according to a first exemplary embodiment of the present invention.

Referring to FIG. 5, the terminal 200 receives coordinate information of neighbor BSs including the serving BS and information of an offset value list from the serving BS (S510). The terminal 200 stores the received information in the internal memory.

When the terminal 200 receives a carrier signal from a neighbor BS (S520), the terminal 200 synchronizes a phase clock of the carrier signal of each BS to a wavelength of the corresponding carrier signal.

Next, when the terminal 200 detects a start point of the carrier signal of each BS (S530), the terminal 200 resets the phase clock of the corresponding carrier signal (S540).

The terminal 200 measures a phase angle of the carrier signal of each BS by using the phase clock of the carrier signal of each BS (S550).

The terminal 200 calculates a difference in the phase angles between the carrier signals of certain two BSs (S560), and compensates for the calculated difference in the phase angles between the carrier signals of the two BSs with an offset value corresponding to the carrier signals of the two BSs received from the serving BS (S570).

The terminal 200 calculates a difference in distances of arrival from the certain two base stations to the terminal 200 by using the offset value-compensated difference in phases between the carrier signals (S580).

For example, the difference in distances of arrival from the BS A and the BS B to the terminal 200 may be calculated as expressed by Equation 3 below.

$$\Delta d_{AB} = \frac{\lambda}{\pi} \{(\varphi_A - \varphi_B - O_B + 2\pi n) \bmod 2\pi n\} \quad \text{(Equation 3)}$$

In Equation 3, $\Delta d_{AB}$ denotes a difference in distances of arrival from the BS A and the BS B to the terminal 200, and $\lambda$ denotes a length of one wavelength of the carrier signals. $\varphi_A$ is a phase angle measured using the start point of the carrier signal of the BS A as a reference, and $\varphi_B$ is a phase angle measured using the start point of the carrier signal of BS B as a reference. $O_B$ denotes an offset value with respect to the BS B calculated by the BS A, and $2\pi n$ is a start point period.

By using the carrier signals received from three or more BSs including the serving BS, the terminal 200 calculates a plurality of differences in distances of arrival by changing the two BSs on the basis of the method described above. For example, the terminal 200 may calculate a difference in distances of arrival from the BSs 110 and 120 to the terminal 200 by using a difference in phases between the carrier signals of the BSs 110 and 120, calculate a difference in distances of arrival from the BSs 120 and 130 to the terminal 200 by using a difference in phases between the carrier signals of the BSs 120 and 130, and calculate a difference in distances of arrival from the BSs 110 and 130 to the terminal 200 by using a difference in phases between the carrier signals of the BSs 110 and 130.

The terminal 200 calculates approximate coordinate information of the terminal 200 by using the plurality of differences in distances of arrival (S590). The terminal 200 may calculate approximate coordinate information of the terminal 200 by applying the plurality of differences in distances of arrival to a hyperbolic secant algorithm.

Figure 6:
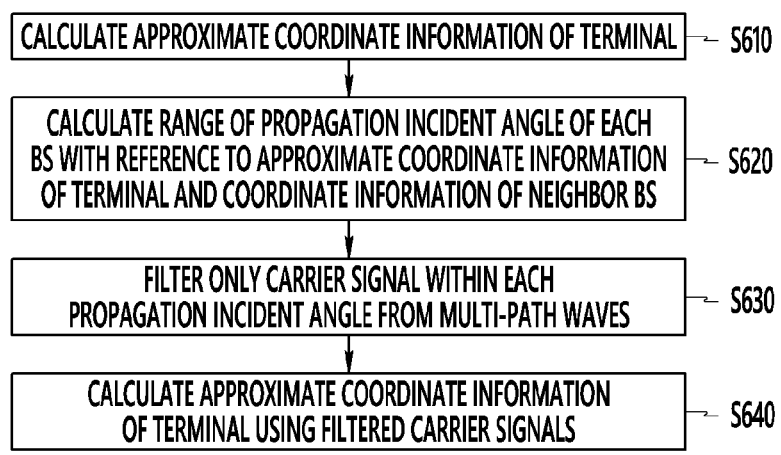

FIG. 6 is a flowchart illustrating a method for calculating a location of a terminal according to a second exemplary embodiment of the present invention.

Referring to FIG. 6, the terminal calculates approximate coordinates of the terminal 200 on the basis of the method described above with reference to FIG. 5 (S610).

The terminal 200 calculates a propagation incident angle range of each BS with reference to the approximate coordinates of the terminal and coordinates of neighbor BSs (S620).

The terminal 200 filters only a carrier signal within the propagation incident angle range in the direction of each BS among multipath waves (S630).

The terminal 200 calculates coordinates of the terminal 200 through the method described above with reference to FIG. 5 by using the filtered carrier signals (S640).

In this manner, a delay spread and angle spread error due to multiple paths may be reduced.

Figure 7:
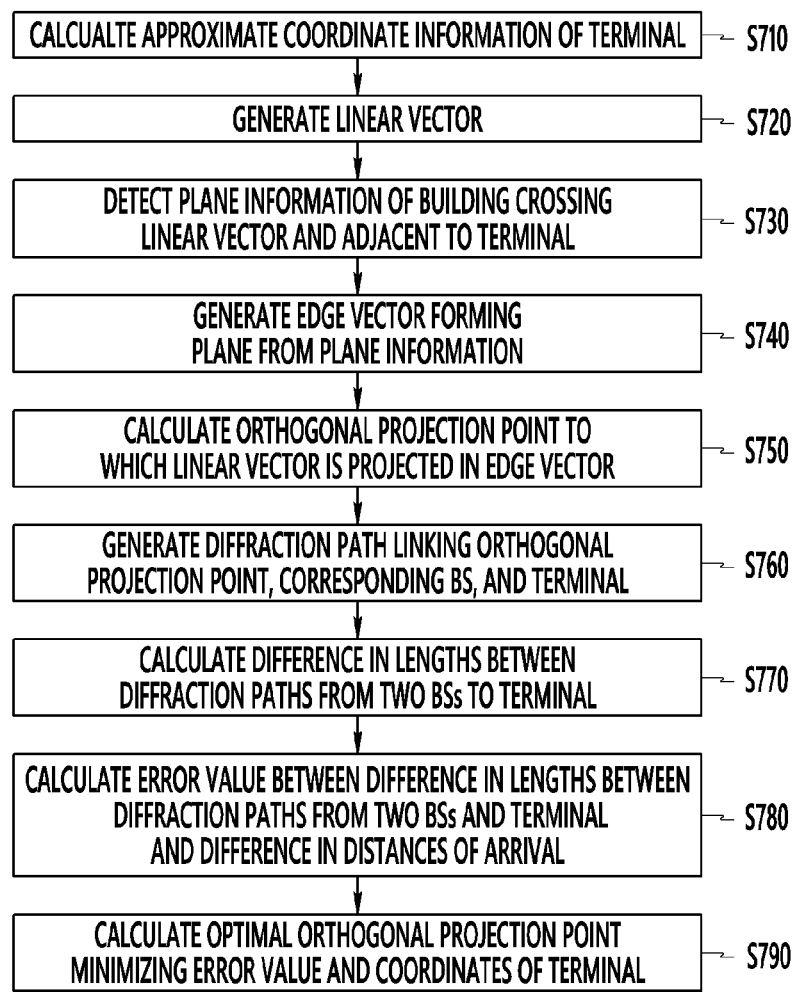

FIG. 7 is a flowchart illustrating a method for calculating a location of a terminal according to a third exemplary embodiment of the present invention.

Referring to FIG. 7, the terminal 200 calculates approximate coordinate information of the terminal 200 on the basis of the method described above with reference to FIG. 5 (S710).

The terminal 200 generates a linear vector connecting the approximate coordinates of the terminal 200 and the coordinates of a neighbor BS (S720).

The terminal 200 detects plane information of a building which intersects the linear vector and which is adjacent to the terminal 200 by using 3D map information stored in the internal memory (S730). Also, the terminal 200 generates an edge vector forming the plane from the plane information of the building adjacent to the terminal 200 (S740).

The terminal 200 calculates an orthogonal projection point to which a linear vector between the terminal 200 and each BS is projected on the edge vector (S750), and generates a diffraction path linking the calculated orthogonal projection point, the corresponding BS, and the terminal 200 (S760).

The terminal 200 calculates differences in lengths of diffraction paths between certain two BS and the terminal 200 (S770). The terminal 200 calculates differences in lengths of diffraction paths between certain two BS and the terminal 200, with respect to all of BSs.

The terminal 200 calculates an error value between the difference in lengths between the diffraction paths calculated from two BSs to the terminal 200 and the differences in distances of arrival from the two BSs to the terminal calculated on the basis of Equation 3 (S780).

The terminal 200 calculates coordinates of the terminal 200 and an optimal orthogonal projection point minimizing the error value (S790). Here, the terminal 200 may calculate the coordinates of the terminal 200 and the optimal orthogonal projection point minimizing the error value by applying maximum likelihood, or the like.

In this manner, a positioning error due to an obstacle in a downtown area or a mountainous area and diffraction of propagation may be minimized.

Figure 8:
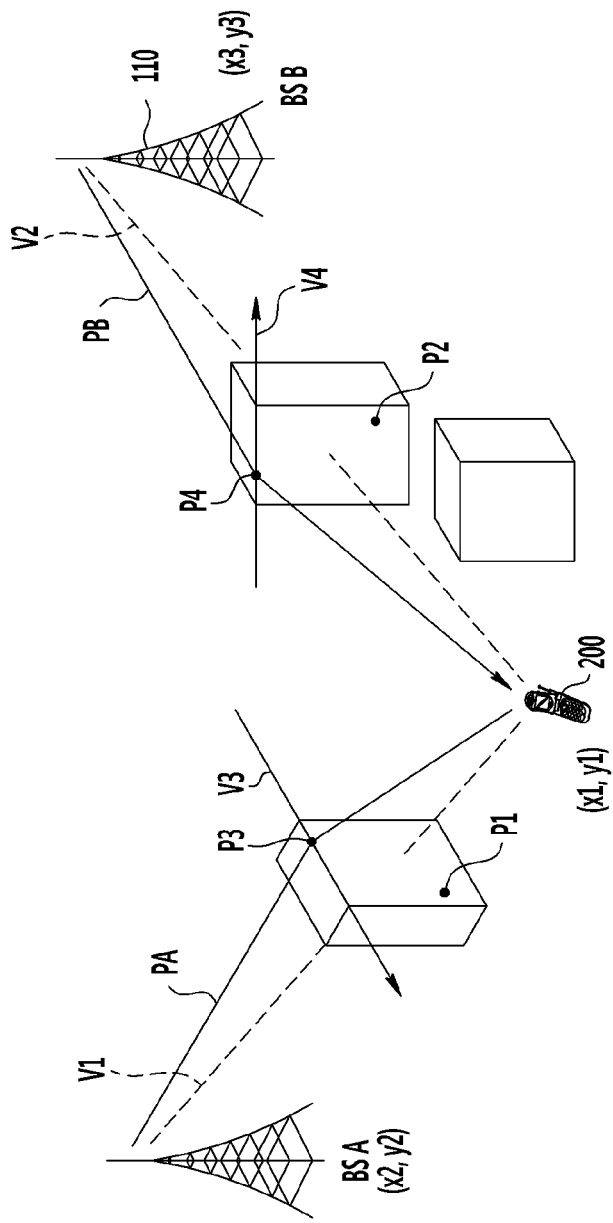
FIG. 8 is a view illustrating a method for calculating a diffraction distance of propagation illustrated in FIG. 7.

FIG. 8 is a view illustrating a method for calculating a diffraction distance of propagation illustrated in FIG. 7.

Referring to FIG. 8, after the approximate coordinate information of the terminal 200 is calculated, the terminal 200 generates a linear vector V1 connecting the approximate coordinates (x1, y1) of the terminal 200 and coordinates (x2, y2) of the BS A, and a linear vector V2 connecting the approximate coordinates (x1, y1) of the terminal 200 and coordinates (x3, y3) of the BS A.

The terminal 200 detects plane information (P1, P2) of a building which intersects the linear vectors V1 and V2 and which is adjacent to the terminal 200. Also, the terminal 200 generates edge vectors V3 and V4 from a plane from the plane information P1 and P2 of the building adjacent to the terminal 200.

The terminal 200 calculates an orthogonal projection point P3 to which the linear vector V1 between the terminal 200 and the BS A is projected on the edge vector V3, and calculates an orthogonal projection point P4 to which the linear vector V2 between the terminal 200 and the BS B is projected on the edge vector V4.

The terminal 200 generates diffraction paths PA and PB linking the calculated orthogonal projection points P3 and P4, the corresponding BSs, and the terminal 200.

The terminal 200 calculates a difference in lengths between the diffraction path PA calculated from the BS A to the terminal 200 and the diffraction path PB calculated from the BS B to the terminal 200.

The terminal 200 calculates an error value between the difference in lengths between the diffraction path PA calculated from the BS A to the terminal 200 and the diffraction path PB calculated from the BS B to the terminal 200, and the difference $\lambda d_{AB}$ in distances of arrival from the BS A and the BS B to the terminal 200 calculated on the basis of Equation 3.

Figure 9:
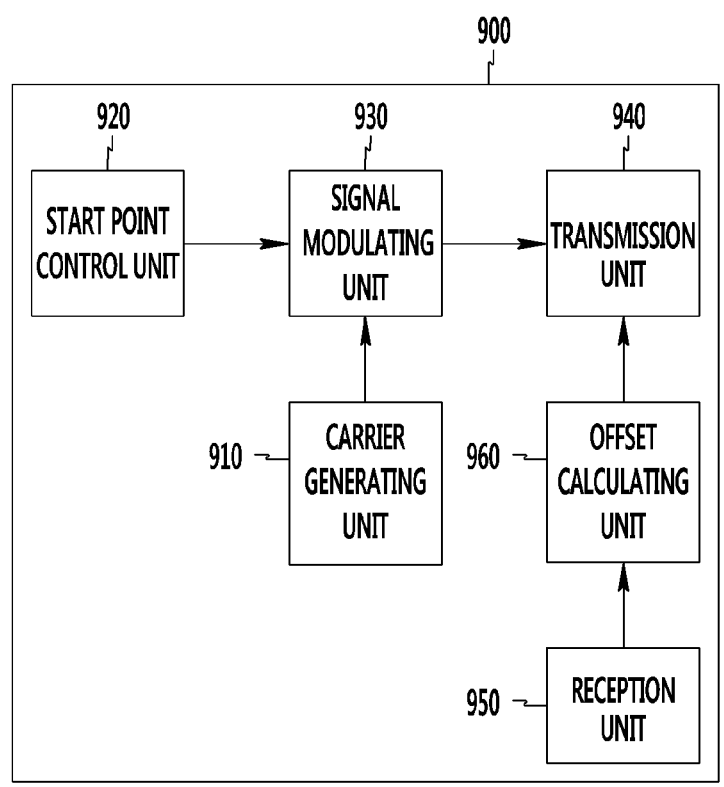
FIG. 9 is a view illustrating a base station according to an exemplary embodiment of the present invention.

FIG. 9 is a view illustrating a base station according to an exemplary embodiment of the present invention.

Referring to FIG. 9, a BS 900 includes a carrier generating unit 910, a start point control unit 920, a signal modulating unit 930, a transmission unit 940, a reception unit 950, and an offset calculating unit 960. The BS 900 corresponds to the BSs 110, 120, 130, the BS A, and the BS B described above.

The carrier generating unit 910 generates a carrier signal having n number of carrier wavelengths.

The start point control unit 920 determines a start point period to be indicated on a carrier.

The signal modulating unit 930 differently modulates at least one among a phase, an amplitude, and a frequency of a carrier signal on the basis of the start point period, and transmits the same through the transmission unit 940. For example, as described above, the signal modulating unit 930 may invert a phase of the carrier signal by 180 degrees on the basis of the start point period.

The transmission unit 940 transmits the carrier signal. The transmission unit 940 transmits an offset value list calculated by the offset calculating unit 960.

The reception unit 950 receives a carrier signal from a neighbor BS.

The offset calculating unit 960 tracks a phase of the carrier signal of the neighbor BS, and detects a start point. The BS 900 measures the number of wavelengths and a phase angle of the carrier signal with respect to the detected start point of the carrier signal. The offset calculating unit 960 calculates an offset value with respect to a relative difference between a phase angle measured from the start point of the carrier signal transmitted by itself and the phase angle measured from the start point of the carrier signal of the neighbor BS.

The offset calculating unit 960 calculates an offset value with respect to every neighbor BS to generate an offset value list, and stores the offset value list in an internal memory. The offset calculating unit 960 transmits the offset value list through the transmission unit 940. The offset value list may be periodically transmitted.

Figure 10:
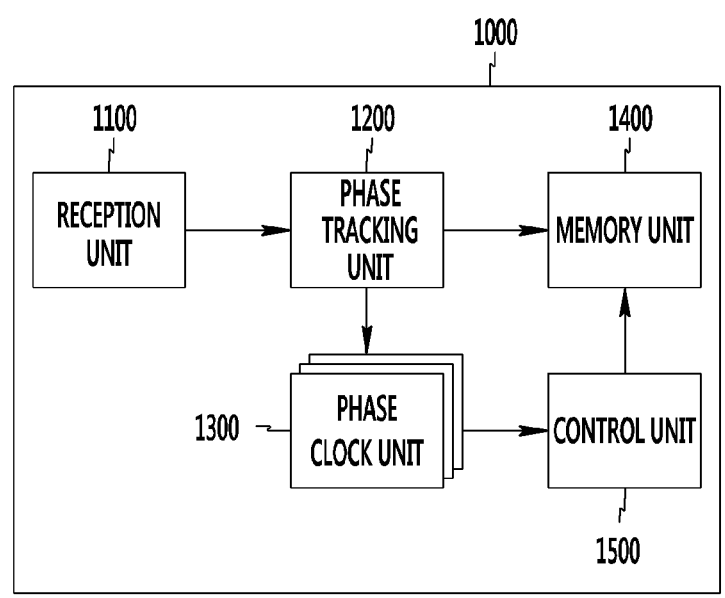
FIG. 10 is a view illustrating a positioning apparatus of a terminal according to an exemplary embodiment of the present invention.

FIG. 10 is a view illustrating a positioning apparatus of a terminal according to an exemplary embodiment of the present invention.

Referring to FIG. 10, a positioning apparatus 1000 of a terminal includes a reception unit 1110, a phase tracking unit 1200, a plurality of phase clock units 1300, a memory unit 1400, and a control unit 1500.

The reception unit 1100 receives carrier signals from nearby BSs including a serving BS. The reception unit 1100 may receive coordinate information of nearby BSs and an offset value list from the serving BS.

The phase tracking unit 1200 tracks phases of the received carrier signals of the BSs, and detects start points and start point periods. The phase tracking unit 1200 may store the received coordinate information and offset value list of the nearby BSs in the memory unit 1400.

The plurality of phase clock units 1300 correspond to the received carrier signals of the BSs. When a start point of a carrier signal of a corresponding BS is detected, each of the phase clock units 1300 resets a phase clock and counts the number of wavelengths of the carrier signal. The plurality of phase clock units 1300 may include a wavelength number counter (not shown) for counting the number of wavelengths of each of the carrier signals.

The memory unit 1400 stores the coordinate information of the nearby BSs and the offset value list received from the serving BS. Also, the memory unit 1400 stores 3D map information.

The control unit 1500 calculates a location of the terminal 200. The control unit 1500 may calculate a location of the terminal 200 on the basis of the method described above with reference to FIGS. 5 through 7. In the case of FIG. 6, the control unit 1500 may calculate a propagation incident angle range of each BS on the basis of the coordinates of the terminal 200 and the coordinates of the nearby BSs received from the serving BS, and control the reception unit 1100 to filter only a carrier signal received within the propagation incident angle range of each BS.

As described above, at least some of functions of the positioning method and apparatus of the terminal according to an exemplary embodiment of the present invention described above may be implemented by hardware or software combined with hardware. For example, a processor realized as a central processing unit (CPU) or any other chip set, a microprocessor, and the like, may perform the functions of the phase tracking unit 1200, the phase clock unit 1300, and the control unit 1500, a transceiver may perform the function of the reception unit 1100, and a memory or a storage may perform the function of the memory unit 1400. The memory may be realized as a random access memory (RAM) such as a medium such as a dynamic random access memory (DRAM), a Rambus DRAM (RDRAM), a synchronous DRAM (SDRAM), or a static RAM (SRAM). The storage may be realized as an optical disk such as a hard disk, a compact disk read only memory (CD-ROM), a CD rewritable (CD-RW), a digital video disk ROM (DVD-ROM), a DVD-RAM, a DVD-RW disk, a blue-ray disk, a flash memory, or a permanent or volatile storage such as various types of RAMs.

Also, at least some functions of the BS for positioning a terminal may be realized by hardware or software combined with hardware. For example, a processor realized as a CPU or any other chip set, a microprocessor, and the like, may perform the functions of the carrier generating unit 910, the start point control unit 920, the signal modulating unit 930, and the offset calculating unit 960, and a transceiver may perform the functions of the transmission unit 940 and the reception unit 950.

According to an embodiment of the present invention, a positioning error level can be reduced, compared with the related art positioning method, based on measurement of a signal arrival time.

Also, stable and reliable positioning performance can be achieved even in a vehicle moving at a high speed or in a downtown area in which severe multiple paths are generated.

The embodiments of the present invention may not necessarily be implemented only through the foregoing devices and methods, but may also be implemented through a program for realizing functions corresponding to the configurations of the embodiments of the present invention, a recording medium including the program, or the like, and such an implementation may be easily made by a skilled person in the art to which the present invention pertains from the foregoing description of the embodiments.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A positioning method of a terminal using a wireless signal, the method comprising:
   receiving carrier signals with start point information indicated thereon from three or more base stations (BSs) including a serving BS;
   calculating a difference in phase angles between carrier signals of two BSs, while changing the two BSs, by using the start point information of the carrier signals of the two BSs among the three or more BSs;
   calculating differences in distances of arrival from the corresponding two BS to the terminal by using the calculated differences in phase angles; and
   calculating coordinates of the terminal by using the calculated differences in distances of arrival.

2. The positioning method of claim 1, wherein at least one among a phase, an amplitude, and a frequency of the carrier signal is changed on the basis of the start point period, and the calculating includes detecting the point at which at least one among the phase, the amplitude, and the frequency is changed, as a start point of the carrier signals.

3. The positioning method of claim 1, wherein the receiving includes:
   calculating a propagation incident angle range of each of the nearby BSs on the basis of the coordinates of the terminal and coordinates of the nearby BSs; and
   filtering only a carrier signal received within the propagation incident angle ranges of each of the BSs.

4. The positioning method of claim 1, wherein the calculating includes:
   generating diffraction paths from BSs, among the nearby BSs, to the terminal by using 3D map information;
   calculating differences in lengths between the diffraction paths from two BSs to the terminal, while changing the two BSs, among the nearby BSs;
   calculating an error between the difference in lengths between the diffraction paths calculated with respect to a same BS subject and a difference in distances of arrival; and
   calculating coordinates of the terminal by using an error value.

5. The positioning method of claim 4, wherein the generating of diffraction paths includes:
   generating a linear vector connecting the coordinates of the terminal and coordinates of any one BS;
   generating an edge vector forming a plane from plane information of a building adjacent to the terminal, while intersecting the linear vector, by using the 3D map information;
   calculating an orthogonal projection point to which the linear vector between the terminal and any one BS is projected on the edge vector; and
   linking the calculated orthogonal projection point, the any one BS, and the terminal to generate a diffraction path from the any one BS to the terminal.

6. The positioning method of claim 5, wherein the calculating of coordinates of the terminal includes calculating the coordinates of the terminal at which an error value is minimized.

7. The positioning method of claim 1, wherein the calculating of a difference in distances of arrival includes:
   receiving an offset value with respect to a difference in phase angles between the serving BS and a neighbor BS of the serving BS, calculated by the serving BS, from the serving BS; and
   compensating for the difference in phase angles between the carrier signals of the two BSs by using the received offset value.

8. The positioning method of claim 1, wherein the receiving of the offset value includes:
   receiving, by the serving BS, the carrier signal from a neighbor BS; calculating, by the serving BS, a phase angle of the carrier signal with respect to a start point of the carrier signal of the neighbor BS;
   calculating, by the serving BS, an offset value with respect to a difference in phases between a phase angle calculated with respect to the start point of the carrier signal transmitted by the serving BS and a phase angle calculated with respect to the start point of the carrier signal of the neighbor BS; and
   transmitting, by the serving BS, the offset value.

9. The positioning method of claim 1, wherein the receiving includes transmitting, by the three or more BSs, carrier signals with frequencies of mutually different bands.

10. The positioning method of claim 1, wherein the receiving includes transmitting, by the three or more BSs, carrier signals at mutually different times.

11. A positioning apparatus of a terminal using a wireless signal, the apparatus comprising:
   a reception unit configured to receive carrier signals with start point information indicated thereon from three or more nearby base stations (BSs) including a serving BS;
   a phase tracking unit configured to detect a start point and a start point period of each of the received carrier signals of the BSs; a plurality of phase clock units configured to calculate a phase angle of each of the carrier signals of the BSs with respect to a start point of each of the carrier signals of the BSs; and
   a control unit configured to calculate a difference in phase angles between carrier signals of two BSs, among the nearby BSs, while changing the two BSs, calculate a difference in distances of arrival from the corresponding two BS to the terminal by using the calculated differences in phase angles, and calculate coordinates of the terminal by using the calculated differences in distances of arrival.

12. The positioning apparatus of claim 11, wherein the control unit generates diffraction paths from the BSs to the terminal by using the calculated coordinates of the terminal and 3D map information, and corrects the coordinates of the terminal by using the diffraction paths from the BSs to the terminal.

13. The positioning apparatus of claim 12, wherein the control unit calculates differences in lengths between the diffraction paths from two BSs to the terminal, while changing the two BSs, calculates an error between the difference in lengths between the diffraction paths calculated with respect to a same BS subject and a difference in distances of arrival, and corrects coordinates of the terminal by using an error value.

14. The positioning apparatus of claim 12, wherein the control unit generates a linear vector connecting the coordinates of the terminal and coordinates of any one BS, generates an edge vector forming a plane from plane information of a building adjacent to the terminal while intersecting the linear vector by using the 3D map information, calculates an orthogonal projection point to which the linear vector between the terminal and any one BS is projected on the edge vector, and links the calculated orthogonal projection point, the any one BS, and the terminal to generate a diffraction path from the any one BS to the terminal.

15. The positioning apparatus of claim 11, wherein the control unit controls the reception unit to filter only a carrier signal received within a propagation incident angle range of the directions of the nearby BSs.

16. The positioning apparatus of claim 15, wherein the control unit calculates a propagation incident angle range of each BS on the basis of the coordinates of the terminal and the coordinates of the nearby BSs received from the serving BS.

17. The positioning apparatus of claim 11, wherein at least one among a phase, an amplitude, and a frequency of the carrier signal is changed on the basis of the start point period, and the phase tracking unit detects the point at which at least one among the phase, the amplitude, and the frequency is changed, as a start point of the carrier signals.

18. The positioning apparatus of claim 11, wherein each of the plurality of phase clock units synchronizes a phase clock with respect to the carrier signal of the corresponding BS to a wavelength of the corresponding carrier signal, and when a start point of the carrier signal of the corresponding BS is detected, each of the plurality of phase clock units resets a phase clock with respect to the carrier signal of the corresponding BS.

19. The positioning apparatus of claim 11, wherein the reception unit receives at least one offset value with respect to a difference in phase angles between the serving BS and a neighbor BS of the serving BS, calculated by the serving BS, through the serving BS, and the control unit compensates for each difference in phase angles between the carrier signals by using the at least one offset value.

20. The positioning apparatus of claim 11, wherein when the interval of the start point period is converted into a distance, the distance is longer than a maximum distance between two BSs.

* * * * *